United States Patent
Doughty et al.

(10) Patent No.: US 11,604,144 B2
(45) Date of Patent: Mar. 14, 2023

(54) TOTAL INTERNAL REFLECTION ENABLED WIDE-FIELD COHERENT ANTI-STOKES RAMAN SCATTERING MICROSCOPY

(71) Applicant: UT-Battelle, LLC, Oak Ridge, TN (US)

(72) Inventors: Benjamin L. Doughty, Knoxville, TN (US); Yingzhong Ma, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 17/240,514

(22) Filed: Apr. 26, 2021

(65) Prior Publication Data
US 2021/0381986 A1    Dec. 9, 2021

Related U.S. Application Data

(60) Provisional application No. 63/015,701, filed on Apr. 27, 2020.

(51) Int. Cl.
*G01N 21/65* (2006.01)
*G01N 21/63* (2006.01)
*G01N 21/21* (2006.01)

(52) U.S. Cl.
CPC ......... *G01N 21/658* (2013.01); *G01N 21/211* (2013.01); *G01N 21/636* (2013.01);
(Continued)

(58) Field of Classification Search
CPC ........... G01N 21/636; G01N 2021/212; G01N 2021/656; G01N 2201/06113; G01N 21/65; G01N 2021/653; G01J 3/10; G01J 3/44
See application file for complete search history.

(56) References Cited

U.S. PATENT DOCUMENTS

2014/0333925 A1* 11/2014 Boppart ................ G01N 21/47
356/300
2015/0354940 A1* 12/2015 Inoue ...................... G01J 3/10
356/301
(Continued)

OTHER PUBLICATIONS

Hofer, M. et al.,"High-speed polarization-resolved coherent Raman scattering imaging," Optica 4, 795-801 (2017) (Year: 2017).*
(Continued)

*Primary Examiner* — Dominic J Bologna
*Assistant Examiner* — Roberto Fabian, Jr.
(74) *Attorney, Agent, or Firm* — Scully Scott Murphy & Presser

(57) ABSTRACT

A system is provided. The system has a femtosecond oscillator to generate pulses used for pump and probe beams. A photonic crystal fiber is disposed in a path of the probe beam and produces pulses for a chirped probe beam. A high NA objective receives the pump and the chirped probe beam, redirects the received beams through a dielectric substrate towards an interface between a sample and the dielectric substrate to cause total internal reflection (TIR) at the sample-substrate interface, and produces corresponding evanescent waves in a portion of the sample adjacent to the sample-substrate interface, and collects a backward-propagating beam of pulses of responsive light. The portion of the sample illuminated by the evanescent waves emits responsive light. The dielectric substrate is transparent to the responsive light, the pump and the chirped probe beam. An image is produced having a specific image size using the received backward-propagating beam.

17 Claims, 11 Drawing Sheets

(52) U.S. Cl.
CPC . *G01N 2021/212* (2013.01); *G01N 2021/656* (2013.01); *G01N 2201/06113* (2013.01)

(56) References Cited

U.S. PATENT DOCUMENTS

| | | | | |
|---|---|---|---|---|
| 2016/0178439 A1* | 6/2016 | Freudiger | ............. | G01J 3/44 356/301 |
| 2019/0154583 A1* | 5/2019 | Hirai | ............. | G01N 21/65 |
| 2019/0391070 A1* | 12/2019 | Morrow | ............. | G01N 21/636 |

OTHER PUBLICATIONS

Fish, K. "Total internal reflection fluorescence (TIRF) microscopy." Curr Protoc Cytom. 2009; Chapter 12: Unit12.18. doi:10.1002/0471142956.cy1218s50 (Year: 2009).*

Mazumder, N. et al. "Label-Free Non-linear Multimodal Optical Microscopy—Basics, Development, and Applications."(2019) Front. Phys. 7:170. doi: 10.3389/fphy.2019.00170 (Year: 2019).*

Minamikawa, T. et al., "Multi-focus excitation coherent anti-Stokes Raman scattering (CARS) microscopy and its applications for real-time imaging." Opt Express. Jun. 8, 2009;17(12):9526-36. doi: 10.1364/oe.17.009526. PMID: 19506600 (Year: 2009).*

8. Fast, Alexander, et al. "Surface-enhanced coherent anti-Stokes Raman imaging of lipids." Applied optics 55.22 (2016): 5994-6000 (Year: 2016).*

Evans, C. et al., "Coherent Anti-Stokes Raman Scattering Microscopy: Chemical Imaging for Biology and Medicine", Annu. Rev. Anal. Chem., 2008, pp. 883-909, vol. 1.

Hofer, M. et al., "High-speed polarization-resolved coherent Raman scattering imaging", Optica, 2017, pp. 795-801, vol. 4.

Camp Jr., C. et al., "High-Speed Coherent Raman Fingerprint Imaging of Biological Tissues", Nat Photonics., 2014, pp. 627-634, vol. 8.

Evans, C. et al., "Chemical imaging of tissue in vivo with video-rate coherent anti-Stokes Raman scattering microscopy", Proc. Natl. Acad. Sci. U.S.A., 2005, pp. 16807-16812, vol. 102.

Heinrich, C. et al., "Wide-field coherent anti-Stokes Raman scattering microscopy", Appl. Phys. Lett., 2004, pp. 816-818, vol. 84.

Heinrich, C. et al., "Selective imaging of saturated and unsaturated lipids by wide-field CARS-microscopy", Optics Express, 2008, pp. 2699-2708, vol. 16.

Toytman, I. et al., "Wide-field coherent anti-Stokes Raman scattering microscopy with non-phase-matching illumination", Optics Lett., 2007, pp. 1941-1943, vol. 32, No. 13.

Toytman, I. et al., "On illumination schemes for wide-field CARS microscopy", Optics Express, 2009, pp. 7339-7347, vol. 17, No. 9.

Lei, M. et al., "Video-rate wide-field coherent anti-Stokes Raman scattering microscopy with collinear nonphase-matching illumination", Journal of Biomedical Optics, 2011, pp. 1-5, vol. 16.

Silve, A. et al., "A wide-field arrangement for single-shot CARS imaging of living cells", J. Raman Spectrosc., 2012, pp. 644-650, vol. 43.

Berto, P. et al., "Wide-field vibrational phase imaging in an extremely folded box—CARS geometry", Optics Lett., 2013, pp. 709-711, vol. 38.

Shen, Y. et al., "Wide-field coherent anti-Stokes Raman scattering microscopy based on picosecond supercontinuum source", Apl Photonics, 2018, pp. 116104-1 to 116104-8, vol. 3.

Jesacher, A. et al., "Wide-field CARSmicroscpy," Coherent Raman Scattering Microscopy, 2013, pp. 161-187.

Fast, A. et al., "Surface-enhanced coherent anti-Stokes Raman imaging of lipids", Appl. Opt., 2016, pp. 5994-6000, vol. 55.

Kenison, J. et al., "Imaging properties of surface-enhanced coherent anti-Stokes Raman scattering microscopy on thin gold films", J. Opt. Soc. Am. B, 2017, pp. 2104-2114, vol. 34.

Pegoraro, A. et al., "Optimally chirped multimodal CARS microscopy based on a single Ti:sapphire oscillator", Optics Express, 2009, pp. 2984-2996, vol. 17.

Watson, B. et al., "Energetics at the Surface: Direct Optical Mapping of Core and Surface Electronic Structure in CdSe Quantum Dots Using Broadband Electronic Sum Frequency Generation Microspectroscopy", Nano Letters, 2019, pp. 6157-6165, vol. 19.

Newport Corporation, "Application Note 36: Coherent Anti-Stokes Raman Scattering", pp. 1-6.

Kamnev, A. et al., "Spectroscopic investigation of indole-3-acetic acid interaction with iron(III)", Journal of Molecular Structure, 2001, pp. 565-572, vol. 563-564.

Liu, Y. et al., "Broadband CARS spectral phase retrieval using a time-domain Kramers-Kronig transform", Optics Lett., 2009, pp. 1363-1365, vol. 34.

Watson, B. et al., "Elucidation of perovskite film micro-orientations using two-photon total internal reflectance fluorescence microscopy", J. Phys. Chem. Lett., 2015, pp. 3283-3288, vol. 6.

Dellepiane, G. et al., "Vibrational spectra and assignment of acetone, $\alpha\alpha\alpha$ acetone-d3 and acetone-d6", Spectrochimica Acta, 1966, pp. 593-614, vol. 22.

Polisetti, S. et al., "Raman chemical imaging of the rhizosphere bacterium *Pantoea* sp. YR343 and its co-culture with *Arabidopsis thaliana*", Analyst, 2016, pp. 2175-2182, vol. 141.

Colon, B. et al., "Total Internal Reflection Transient Absorption Microscopy: An Online Detection Method for Microfluidics", J. Phys. Chem. A, 2020, pp. 4160-4170, vol. 124.

Watson, B. et al., "Shedding light on surface effects: nonlinear probes of complex materials", Proc. of SPIE, 2018, pp. 106380M-1 to 106380M-8, vol. 10638.

"Total internal reflection fluorescence microscope", https://en.wikipedia.org/wiki/Total_internal_reflection_fluorescence_microscope, printed Aug. 3, 2021.

* cited by examiner

TOTAL INTERNAL REFLECTION ENABLED WIDE-FIELD COHERENT ANTI-STOKES RAMAN SCATTERING MICROSCOPY

CROSS-REFERENCE TO RELATED APPLICATIONS

This application claims the benefit of and priority to U.S. Provisional Application Ser. No. 63/015,701 filed on Apr. 27, 2020.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to wide-field Coherent anti-Stokes Raman scattering (CARS) microscopy using total internal reflection.

BACKGROUND

Coherent anti-Stokes Raman scattering (CARS) microscopy is one way to obtain chemical images of complex and living biological systems, due to its intrinsic vibrational contrast, high sensitivity and capability for three-dimensional sectioning. As a nonlinear four-wave mixing phenomenon, the CARS process is driven by a pump pulse at frequency $\omega_p$ and a Stokes pulse at $\omega_s$. When the frequency difference of these pulses $w_p$-$w_s$ matches the frequency of a Raman active molecular vibration, a strong anti-Stokes signal arises at $\omega_{as}=2\omega_p-\omega_s$ in a well-defined phase-matched direction. This resonance condition provides a means to target specific vibrational chromophores in complex media without the need to label and possibly perturb the sample of interest.

CARS imaging is typically performed by point-scanning the sample with tightly focused collinear pump and Stokes beams and collecting the generated anti-Stokes light. Despite its wide applications to a variety of complex systems, this point-scanning approach is generally time-consuming and often challenging to isolate those processes of interest taking place near an interface or that evolve in time from nearby bulk responses.

An alternative approach, wide-field CARS microscopy, has the potential for more rapid and simultaneous acquisition of CARS images across the entire field of view with enhanced signals from interfacial chemical species below the diffraction limit of light.

Because a large sample area must be simultaneously illuminated by the pump and Stokes beams, it becomes challenging to achieve a sufficiently strong excitation field to generate third-order optical responses across the entire field of view. This is critical, as the level of the CARS signal generated ultimately determines the speed of image acquisition and whether such a wide-field modality is feasible for a given experiment.

A known wide-field CARS microscopy exploits total internal reflection (TIR) beam geometry, however, it uses a gold film coverslip (substrate). The gold film coverslip enhances the excitation field of the pump and the Stokes pulses from the picosecond light source. But, because a direct contact with a metallic surface may alter the physiology and functionality of some living cells, the use of metallic coverslips for CARS microscopy is not desired. However, without critical enhancement induced by this plasmonic substrate, the use of picosecond pump and Stokes pulses has proven to be too weak to generate appreciable CARS signals. This limitation arises from insufficiently intense excitation fields originating from the picosecond laser source.

SUMMARY

Accordingly, disclosed is a system which may comprises an oscillator, a beam splitter, a photonic crystal fiber (PCF), objective optics and a camera. The oscillator may be configured to emit femtosecond (fs) pulses of light centered at a preset wavelength. The beam splitter may be disposed in a path of the emitted pulses of light and may be configured to split the emitted light into pulses for a pump beam and a probe beam. The PCF may be disposed in a path of the probe beam and may be configured to produce pulses for a chirped probe beam. The objective optics may be configured to receive the pump beam and the chirped probe beam, redirect the received pump and chirped probe beams through a dielectric substrate towards an interface between a sample and the dielectric substrate to cause total internal reflection (TIR) of the pump beam and the chirped probe beam at the sample-substrate interface, and produce corresponding evanescent waves in a portion of the sample adjacent to the sample-substrate interface, and collect a backward-propagating beam of pulses of responsive light that propagates from the portion of the sample through the dielectric substrate towards the objective optics. The received pump and chirped probe beams by the objective optics may be spatially and temporally aligned. The portion of the sample illuminated by the evanescent waves may emit responsive light. The dielectric substrate may be transparent to the responsive light emitted by the portion of the sample. The sample may be disposed on the dielectric substrate. The dielectric substrate may be transparent to both the pump beam and the chirped probe beam.

The camera may be configured to receive, from the objective optics, the backward-propagating beam, and produce an image of the sample having a specific image size using the received backward-propagating beam.

In an aspect of the disclosure, the probe light may be Stokes light and the responsive light may be CARS light.

In an aspect of the disclosure, the evanescent waves may be within 200 nm of the sample-substrate interface.

In an aspect of the disclosure, the system may further comprise a filter disposed in a path of the chirped probe beam from the PCF. The PCF may provide the chirped probe beam having a first spectrum and the filter may provide a target spectrum from the first spectrum output from the PCF.

In an aspect of the disclosure, the target spectrum may be a wavelength range of 850 nm-1200 nm.

In an aspect of the disclosure, the system may further comprise a delay such as a delay mirror system. This mirrors may be disposed in a path of the pump beam which may be configured to move between a plurality of positions to change an arrival time of the pump beam with respect to the chirped probe beam at the sample-substrate interface. In an aspect of the disclosure, the responsive light emitted by the portion of the sample adjacent to the sample-substrate interface may have a spectrum that is shifted in accordance with the arrival time corresponding to a respective position of the mirrors. In an aspect of the disclosure, the position of the mirrors may be controlled by a processor. A target position may be based on the sample.

In an aspect of the disclosure, the position of the mirrors enables capturing of images from the responsive light having respective shifted spectra corresponding to Raman modes about 1000 cm$^{-1}$ to about 3500 cm$^{-1}$.

In an aspect of the disclosure, the power of the beams may be controlled. For example, the power ratio of the beams may be adjusted to have a target ratio. In other aspects, the system may also comprise a power regulator disposed in the path of the pump beam to control the power of the pump beam seen at the sample. The power may be adjusted based on a sample type. In an aspect of the disclosure, the pump may have a fluence at the sample in a range of 20-420 fJ/($\mu$m)$^2$. In an aspect of the disclosure, the probe may have a fluence at the sample in a range of 5-15 fJ/($\mu$m)$^2$.

In an aspect of the disclosure, an illumination area of the sample and an image size on the camera may be independently controllable. In an aspect of the disclosure, the system may have a beam expander disposed in front of the camera to independently control the image size. The image size may be about 20 $\mu$m×20 $\mu$m to about 80 $\mu$m×80 $\mu$m. The illumination area may be about 60 $\mu$m×60 $\mu$m to about 100 $\mu$m×100 $\mu$m at the sample-substrate interface.

In an aspect of the disclosure, the system may further comprise a lens which is offset with respect to a center of the pump beam and the chirped probe beam. The lens may be moveable in three-dimensions to adjust the angle and/or size of the beams.

In an aspect of the disclosure, the system may produce images of an opaque sample.

In an aspect of the disclosure, a calibration system may be used to produce a spectrum of the responsive light corresponding to the sample corresponding to different delays. The calibration system may comprise collection optics and a spectrograph. The collection optics may be configured to collect forward-propagating responsive beam that propagates from the portion of the sample towards the objective optics. The spectrograph may be configured to receive, from the collection optics, the forward-propagating beam from the portion of the sample and produce a spectrum of the responsive light corresponding to the sample using the received forward-propagating beam.

BRIEF DESCRIPTION OF THE DRAWINGS

FIGS. 11B-11D are CARS images acquire from a *Pantoea* sp. YR343 cells using different pulse fluences. The pump fluence for FIG. 11B is 184.3 fJ/$\mu$m$^2$, pump fluence for FIG. 11C is 76.4 fJ/$\mu$m$^2$, and pump fluence for FIG. 11D is 28.6 fJ/$\mu$m$^2$.

DETAILED DESCRIPTION

Figure 1:
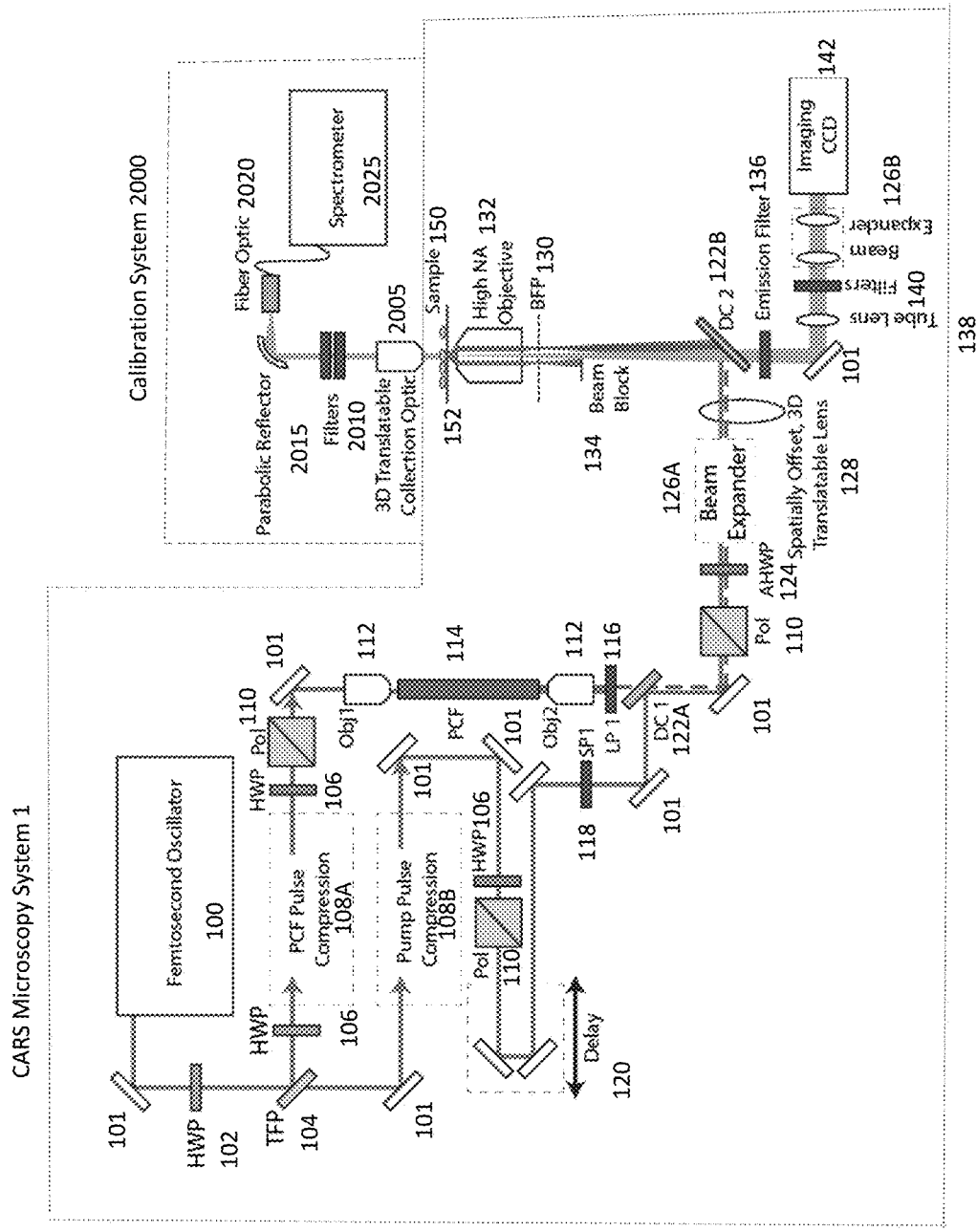
FIG. 1 depicts a wide-field Coherent anti-Stokes Raman scattering (CARS) microscopy with a calibration system in accordance with aspects of the disclosure.

FIG. 1 depicts a wide-field Coherent anti-Stokes Raman scattering (CARS) microscopy system 1 in accordance with aspects of the disclosure. The system 1 is identified by small dashed lines. FIG. 1 also depicts a calibration system 2000 in accordance with aspects of the disclosure.

The wide-field CARS microscope enabled by a total internal reflection (TIR) excitation scheme uses an oscillator 100 as a light source. This oscillator 100 is used as the seed for both spectrally asymmetric pump (see, e.g., FIG. 6 (bottom)) and temporally chirped broadband near-infrared Stokes pulses.

"Chirped" used herein refers to a time dependence of the instantaneous frequency of an optical pulse. In other words, different frequencies in a beam will arrive at a given point in space at different times.

In accordance with aspects of the disclosure, the oscillator 100 is a femtosecond oscillator. An increase in the light intensity at the sample 150 can be achieved by using laser pulses with much shorter temporal durations, which will provide corresponding higher peak intensities and signal levels in the CARS. In some aspects of the disclosure, the oscillator 100 may be a Ti:Sapphire laser, such as one available from SpectraPhysics® (e.g., a Tsunami). The laser may produce pulses between 20 and 100 fs. Shorter pulses such as, 20 fs, may produce more wavelengths, however, longer pulses such as, 100 fs, may have fewer colors but easier to differentiate responsive CARS signals. In an aspect of the disclosure, the pulses may be 50 fs pulses. The center wavelength of the pulses may depend on the application. In an aspect of the disclosure, the center wavelength may be 800 nm-815 nm. For example, the center wavelength may be 809 nm. The light source may have a repetition rate above 70 MHz. For example, the repetition rate may be about 82 MHz. The pulses may have an average power between 1 W and 2 W.

The pulses from the oscillator 100 are separated into two different paths: a first path for the Stokes pulses (also referred to as probe pulses) and a second path for the pump pulses. The pulses from the oscillator 100 may be polarized, such as having a horizontal polarization.

The pulses from the oscillator 100 may be guided or steered to a half waveplate 102 (HWP) by one or more mirrors 101. The angle of the mirror(s) may be adjusted based on the space of the set up, as needed. The HWP 102 provides for a controllable power for the light pulses (beams) for the different paths. The HWP 102 rotates the polarization of the light exiting the half waveplate with respect to that entering the half waveplate.

A thin film polarizer 104 (TFP) is positioned in the beam path exiting the HWP 102. The TFP 104 acts as a beam splitter dividing the incoming beam from the half waveplate 102 into the different light paths. The TFP 104 has a coating which reflects light pulses having a specific polarization and allows though light pulses having an orthogonal polarization.

Figure 2:
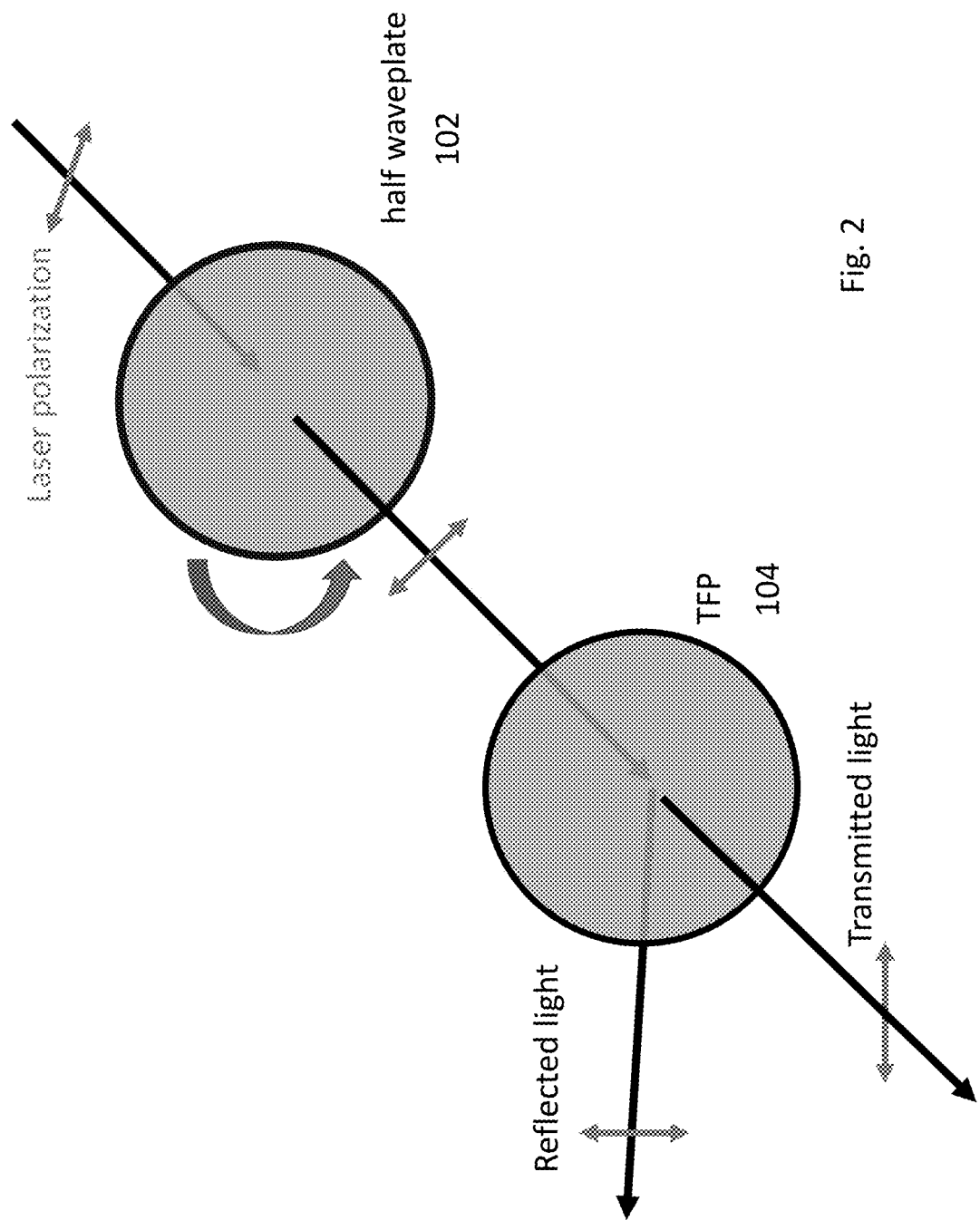
FIG. 2 depicts a half waveplate and thin film polarizer for power tuning and beam splitting in accordance with aspects of the disclosure.

FIG. 2 depicts the HWP 102 and TFP 104. As shown in FIG. 2, the pulses (beam) from the oscillator 100 have a horizontal polarization. The orientation of the HWP 102 rotates the polarization as desired. In an aspect of the disclosure, the HWP 102 may be manually rotated. In other aspects of the disclosure, the HWP 102 may be mounted on a rotating stage and the angle of rotation of the HWP 102 may be controlled via a processor, as need. In an aspect of the disclosure, the HWP 102 may be rotated such that the ratio of pump to Stokes is 5:1 to 1:1.5. For example, the ratio may be 4.9:1. In an aspect of the disclosure, the power of the pump may be set high because the strong anti-Stokes signal is a function of 2 times the pump. The rotation of polarization of the pulses to a specific angle between vertical and horizontal results in the pulses have a both vertical and horizontal components. The specific angle determines the relative amount of the vertical and horizontal components.

As shown in FIG. 2, the TFP 104 reflects light with vertical polarization and transmits light with a horizontal polarization. The TFP 104 is angled with respect to the HWP 102. In an aspect of the disclosure, the angle may be 52 degrees. This angle may have a certain tolerance for variance such as ±1 or 2 degrees.

Figure 3:
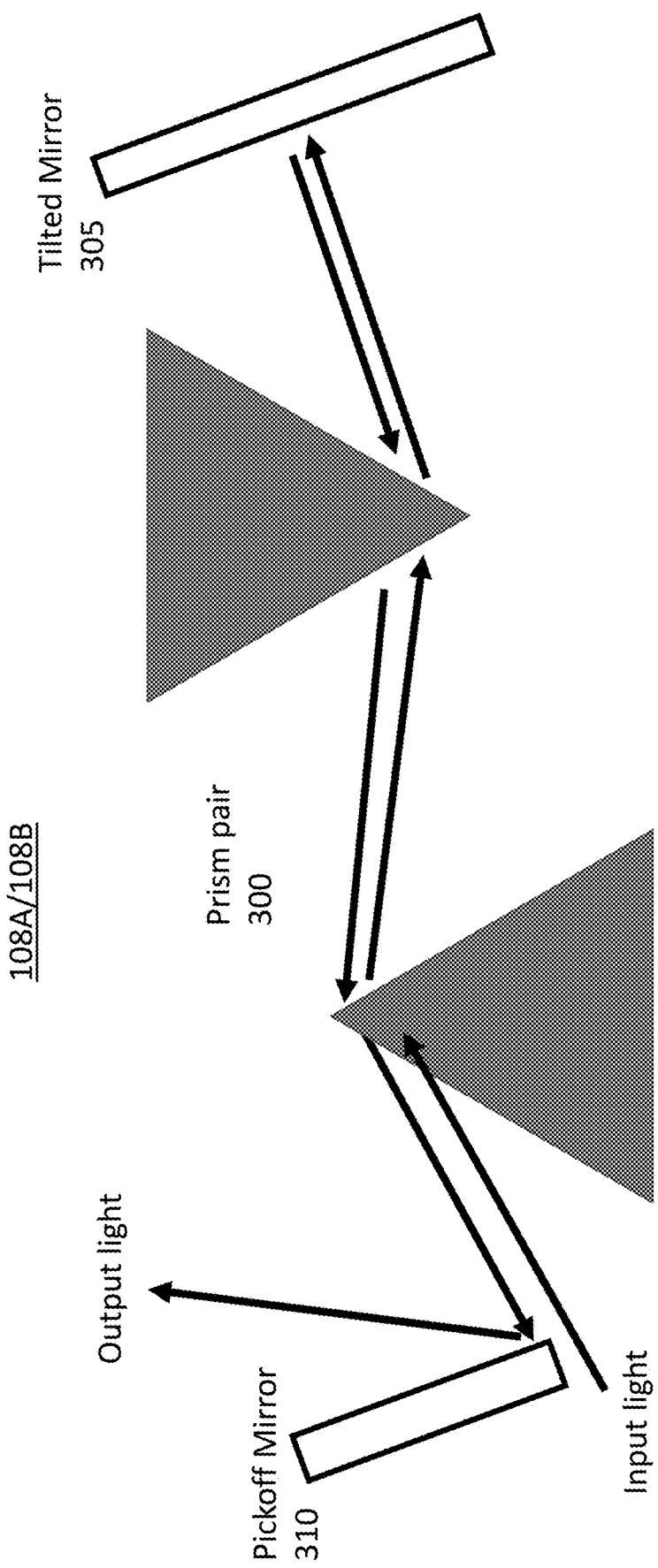
FIG. 3 depicts a pulse compression apparatus in accordance with aspects of the disclosure.

The reflected light, e.g., beam containing pulses, may be used for the Stoke pulses. The reflected light has a vertical polarization. The polarization may be rotated again using another HWP 106. However, in this case, the HWP 106 may be fixably mounted. The pulses in the beam may be compressed using a pulse compression apparatus 108A to shorten the pulses to its nominal value (e.g., pulse fs of the oscillator) (e.g., provides the shortest pulses with the highest peak power). This compensates for dispersion in the optics. In an aspect of the disclosure, the pulse compression apparatus 108A may be a prism pair with a pickoff mirror, such as shown in FIG. 3. However, in other aspects of the disclosure, the pulse compression apparatus 108A may comprise grating pairs or a chirped mirror system.

FIG. 3 depicts an example of a pulse compression apparatus 108A (108B). The component of the compression apparatus for both the pump and probe are the same and will be described together. The input light is the light from the HWP 106 (in the case of the Stokes beam) or a light from a mirror 101 or TFP 104 (in the case of the pump beam). The pulse compression for the probe beam is shown in FIG. 1 as "PCF Pulse Compression". The pulse compression apparatus 108A comprises a prism pair 300. The prisms have opposite orientations. For example, one of the prisms has an upward orientation and another has a downward orientation. The apparatus 108A also has a mirror which is tilted (tilted mirror 305) to reflect the beam from the prism pair back through the same prism pair.

When the beam exits the prism, it is offset vertically from the position it entered. The pulse compression apparatus 108A further comprises a pickoff mirror 310 to redirect the light.

In an aspect of the disclosure, the system 1 may also include another HWP 106 and a polarizer 110 to optimize the polarization of the Stokes beam, as needed. This HWP 106 may or may not be fixed. In an aspect of the disclosure, the HWP 106 after the pulse compression may be rotatable to act as a power regulator. The power regulator for the Stokes beam is optional. In an aspect of the disclosure, the power regulator (HWP 106/polarizer 110) for the Stokes beam may have two positions. One position where the power regulator (HWP 106/polarizer 110) is aligned with the path of the Stokes beam and another where power regulator (HWP 106/polarizer 110) is offset (not aligned). When power regulation is needed, the power regulator (HWP 106/polarizer 110) may be moved into alignment with the Stokes beam. The movement may be manual or motorized.

The Stokes beam may be steered or directed towards a photonic crystal fiber (PCF) 114 using one or more mirrors 101 and an objective lens Obj1 112. The objective lens 112 may be moveable to provide optimal focus of the Stokes beam on the PCF 114. The PCF 114 has a small opening and the movement enables the beam to be focused into the opening (and on the fiber within the PCF 114).

The PCF 114 produces a chirped supercontinuum beam (pulses). In an aspect of the disclosure, the chirped beam is broadband and includes visible light and near-infrared light. A PCF 114 may be selected to provides a wide range of wavelengths in the near-infrared spectra such that a large number of Raman modes may be examined and obtained. In an aspect of the disclosure, the PCF 114 may produce a spectrum up to 1200-1400 nm. In other aspects, the PCF 114 may generate a supercontinuum up to 1600 nm.

Figure 7:
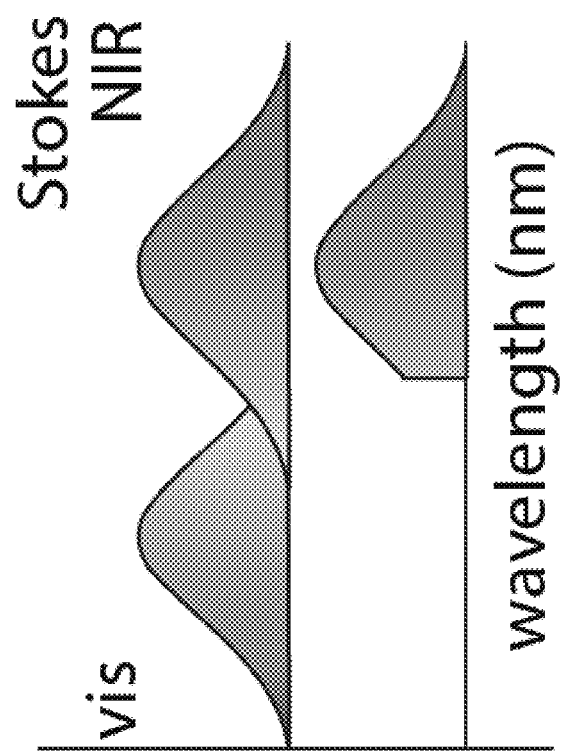
FIG. 7 depicts a representation of the Stokes pulse before and after filtering in accordance with aspects of the disclosure.

For example, one such PCF 114 may be obtained from Newport Corporation and have model number SCG-800-CARS. This PCF is designed to be used with a femtosecond laser with a center wavelength about 800 nm. FIG. 7 depicts a representative examples of the supercontinuum light output by the PCF 114. As seen in FIG. 7, the output includes the visible light (VIS) and Stokes NIR (top).

The Stokes beam (pulses)/chirped probe beam output by the PCF 114 may be focused using an objective lens 112 (Obj2). Similar to Obj 1, Obj 2 may be moveable to align with the opening at the output end of the PCF 114.

The chirped probe beam may be filtered by a Long Pass Filter 116 (LPF) to remove the visible light pulses. In an aspect of the disclosure, the LPF 116 may be an 800-815 nm LPF. The type of LPF may depend on the center wavelength of the oscillator 100. In an aspect of the disclosure, the LPF may be an 810 nm LPF.

The pump beam output from the TFP 104 may be steered to its pulse compression apparatus 108B using one or more mirrors 101. The pulse compression apparatus 108B may be the same as the pulse compression apparatus 108A.

The pump beam (pulses) output from the pulse compression apparatus 108B may be steered to a delay 120 via one or more mirrors 101. Optionally, another HWP 106 and polarizer 110 may be placed in the path between the pulse compression apparatus 108B and the delay 120. The combination of the HWP 106 and polarizer 110 acts as another power regulator such that the power of the pump beam may be reduced, if needed. For example, when the sample may contain cells or certain materials that may be damaged by a pump beam having a high power level, the HWP 106 may be rotated to reduce the power of the pump beam to avoid damage to the sample. In an aspect of the disclosure, the power regulator (HWP 106/polarizer 110) for the pump beam may have two positions. One position where the power regulator (HWP 106/polarizer 110) is aligned with the path of the pump beam and another where power regulator (HWP 106/polarizer 110) is offset (not aligned). When power regulation is needed, the power regulator (HWP 106/polarizer 110) may be moved into alignment with the pump beam. The movement may be manual or motorized.

In an aspect of the disclosure, the combination of the HWP 102 and the power regulation for the pump beam (pulses) enables the pump fluence at the sample 150/substrate 152 about 20 to 420 fJ/$\mu m^2$. Similarly, the combination of the HWP 102 and the power regulation for the chirped probe beam (pulses) enables the probe fluence at the sample 150/substrate 152 about 5 to 15 fJ/$\mu m^2$.

Figure 4:
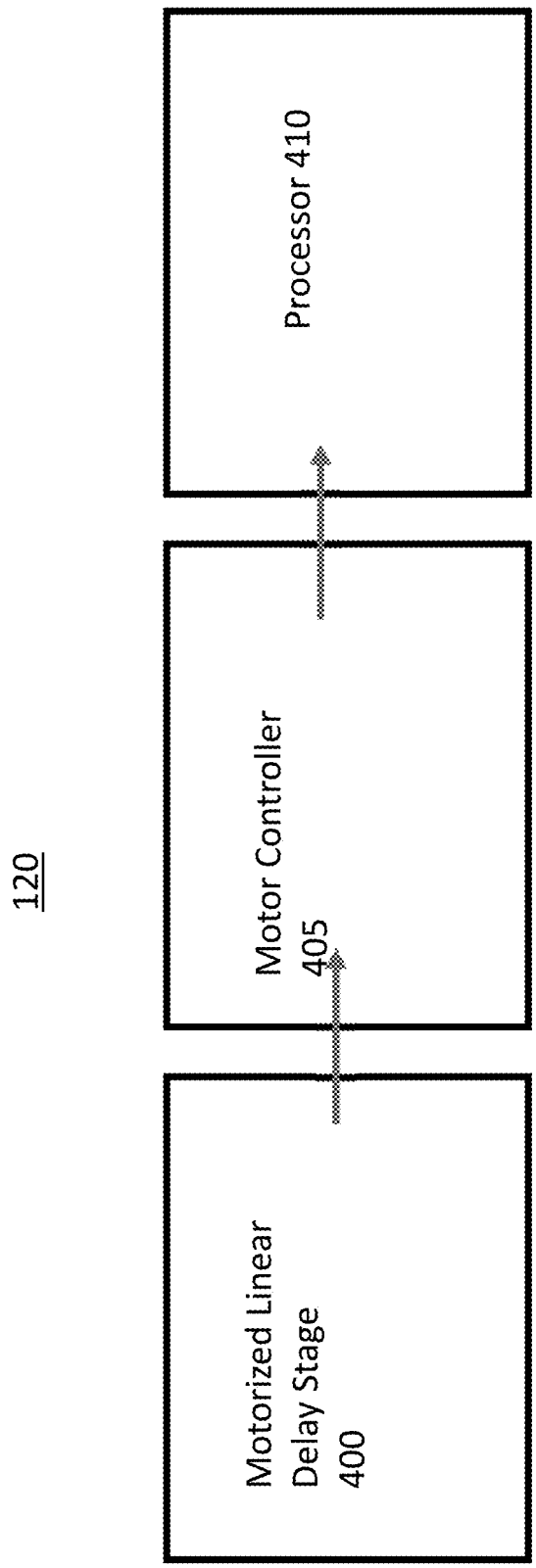
FIG. 4 depicts a block diagram of a delay in accordance with aspects of the disclosure.

The delay 120 may be positioned in the path of the pump beam. The delay 120 is configured to change the time in which light pulses in the pump beam arrive at the sample 150/substrate 152. This delay is controllable. FIG. 4 illustrates an example of the delay 120. In an aspect of the disclosure, the delay 120 may comprise a motorized linear delay stage 400. The motorized linear delay stage 400 may comprise at least two mirrors (reflectors) to steer the light. The mirrors are moveable to lengthen the light path or shorten the light path. The linear delay stage 400 may have a track which enables the mirrors to slide. The linear delay stage 400 may comprise a motor. In an aspect of the disclosure, the motor may be a stepper-motor. A linear delay stage 400 may be obtained from Newport Corporation, Model No. UTM150PP1HL. However, the linear delay stage 400 is not limited to a stepper-motor. For example, the linear delay stage 400 may comprise a DC servo motor.

The delay 120 further comprises a motor controller 405 and a processor 410. The motor controller 405 corresponds to the type of motor in the linear delay stage 400. For example, if a stepper-motor is in the linear delay stage 400, the motor controller 405 may be a stepper-motor controller. The motor controller 405 controls the motor in the linear delay stage 400 based on instructions/commands received from the processor 410.

The processor 410 may be one or more CPUs. In other aspects of the disclosure, the processor 410 may be a microcontroller or microprocessor or any other processing hardware such as an FPGA. In an aspect of the disclosure, the processor 410 may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis. The processor 410 may receive an input for a specific wavenumber (Raman mode) and control the motor controller 405 to set the position of the mirrors in the linear delay stage 400 based on the specific wavenumber. In other aspects, the processor 410 may receive an input for a specific wavelength.

In an aspect of the disclosure, the relationship between wavenumbers and delay may be determined during a calibration stage using the calibration system 2000. In other aspects, the relationship may be set via a look up table preset in the storage device such as memory.

The delay of the pump beam (pulses) changes the relative timing between the pump pulse and the chirped probe beam (Stokes beam). Since the probe beam is chirped, the delay sets which wavelength of the chirped probe beam and the pump pulse overlaps with at time of arrival on the sample 150/substrate 152. A spectrally broad and temporally chirped Stokes pulse allows for Raman modes spanning ~1000 to ~3500 cm$^{-1}$ to be imaged by simply varying the time delay between the pump and Stokes pulses. The system 1 is not limited to the above range.

The delayed pump beam (pulses) may be steered to a short pass filter 118 (SP1) using one or more mirrors 101. The SP1 118 removes the long wavelengths in the pulse(s) to create an asymmetric pulse. This creates a better contrast. The longer wavelengths are also rejected by DC1. However, a dichroic mirror is not ideal and a certain amount of the long wavelengths may be reflected. The filtering of the long wavelengths by SP1 118 reduces the amount of energy that may be reflected by DC 1.

Figure 6:
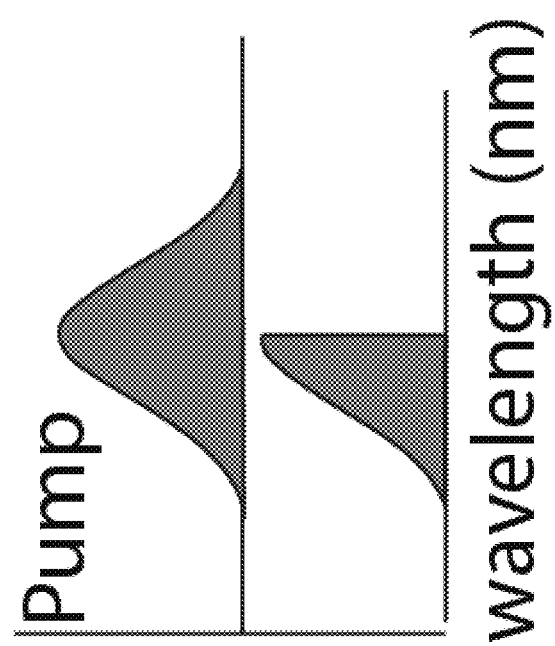
FIG. 6 depicts a representation of a pump pulse before and after filtering in accordance with aspects of the disclosure.

FIG. 6 depicts a representation of an example of a pump pulse, before and after the SP1 118.

The delayed pump beam (pulses) and the chirped probe beam (pulses) are spatially combined using a dichroic mirror 122A (DC1). A dichroic mirror has different reflection/transmission proprieties at different wavelengths. In an aspect of the disclosure, the delayed pump beam may be steered to DC1 122A via one or more mirrors 101. The dichroic mirror DC1 112A may transmit the chirped probe beam (Stokes beam) and reflect the pump beam as shown in FIG. 1. After DC1 122A, the pump beam and the chirped probe beam are spatial aligned.

In an aspect of the disclosure, the combined beams are polarization purified via another polarizer 110. One or more mirrors 101 may be used to steer the light to the polarizer 110. The polarized light beam may be rotated via an achromatic half waveplate 124 to p-polarization. An AHWP is used due to the broadband of the chirped probe beam. A p-polarization is needed for total internal reflection at the substrate-sample interface.

The system 1 also comprises a beam expander 126A in the path of the combined beams (polarized). In an aspect of the disclosure, the beam expander 126A may comprise one or more curved mirrors. The curved mirrors spatially expand the beams. The used of the curved mirrors does not have chromatic aberrations due to the different colors of light being expanded differently (e.g., in the Stokes pulse). The beam expender 126A provides a spatially expanded beam of the combined pump and chirped probe beam. In an aspect of the disclosure, the spatially expanded beam may be about 1 cm.

In an aspect of the disclosure, the beam expander 126A comprises at least two curved mirrors. The two curved mirrors may expand the beam by at least 2×. In other aspects, the two curved mirrors may expand the beam by at least 4×. The beam expander 126A in combination with the other optics provides the spatially expanded beams which enables obtaining the CARS for a region of interest without having to point scan.

Figure 8:
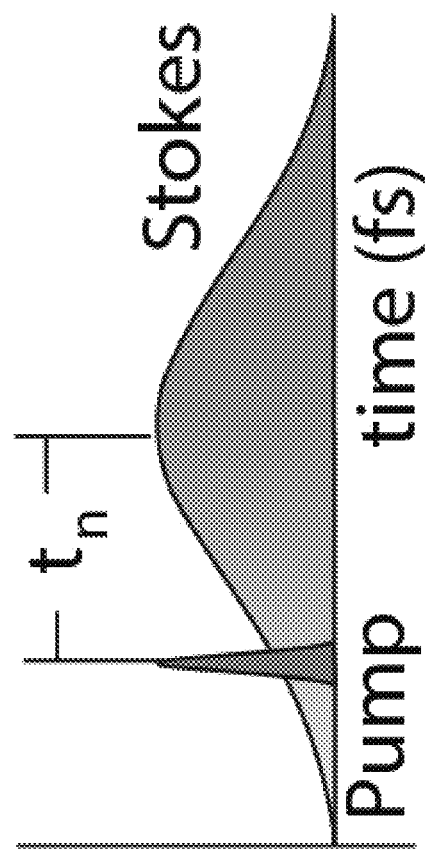
FIG. 8 depicts a representation of pump pulse and Stokes pulse at a specific time delay which enter the high NA objective lens in accordance with aspects of the disclosure.

The system 1 also comprises a spatially offset lens 128. This lens 128 is moveable. For example, the lens 128 may be moved in 3-dimensions for focusing and achieving alignment into the objective to satisfy total internal reflection criteria. For example, the movement of the lens 128 in the x and y direction changes the angle of the beam and aligns the beam near an edge of the high NA objective 132 to achieve the total internal reflection at the substrate-sample interface. Movement in the z-direction, changes the illumination area on the sample 150. In an aspect of the disclosure, the lens 128 is positioned to focus the beams (combined pump and chirped probe beam) on the back focal plane 132 of a high numerical aperture (NA) objective 132. A representation of a pulse of the combined pump and chirped probe beam (Stokes) is shown in FIG. 8 for a specific time delay $t_n$.

The system 1 also comprises another dichroic mirror 122B (DC2). DC2 122B reflects the combined pump and chirped probe beam. The DC2 122B is transmissive of the responsive light emitted by the sample 150.

Figure 5:
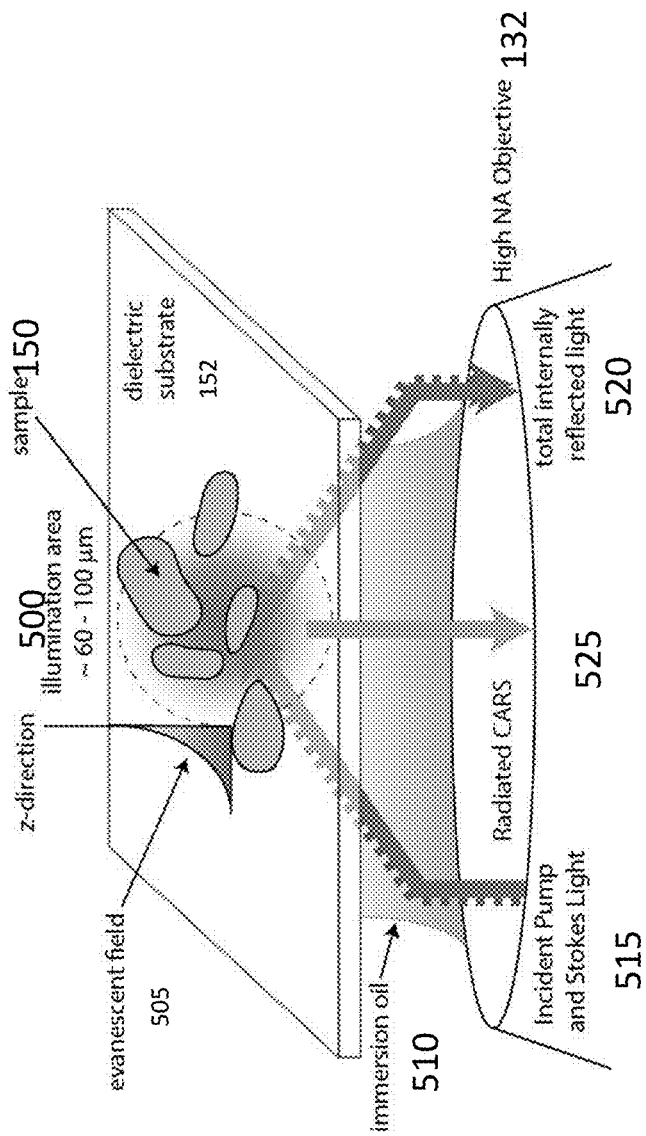
FIG. 5 depicts a dielectric substrate with a sample and respective light in accordance with aspects of the disclosure.

The objective 132 may be an oil immersion lens. The immersion oil 510 is shown in FIG. 5. The objective 132 may have a high NA. For example, the NA may be above 1.4. In an aspect of the disclosure, the NA may be 1.49. The objective 132 may have a magnification of 60×. In other aspects, the magnification may be 100×.

The objective 132 is configured to cause total internal reflection at the substrate-sample interface. For example, the objective may be obtained from Nikon® 1.49 NA, Apo 100× (TIRF). Due to the high numerical aperture, the objective 132 enables a relatively shallow evanescent field 505 to be emitted near the sample/substrate interface. The TIR in the substrate 152 causes the evanescent field 505. The evanescent field 505 is shown in FIG. 5. A representative of the field strength as a function of the z-direction is shown in FIG. 5. The magnitude of the evanescent field 505 decreases the further into the sample 150 (as the distance from the substrate 152 increases). In an aspect of the disclosure, the objective 132 enables the evanescent field 505 to penetrate into the sample 150 less than about 200 nm allowing for selective illumination of a small region in the z-direction. For example, the high NA objective 132 enhances surface sensitivity by confining the evanescent field 505 near the sample/substrate interface. This allows for imaging thin samples or species near interfaces. Confining the evanescent field 505 eliminates bulk and background responsive emissions from species away from the sample/substrate interface.

The dielectric substrate 152 may be made of glass. In other aspects, the substrate 152 may be made of Quartz. Additional substrates may be used. However, the additional substrates would have to match the index of refraction of the immersion oil. The dielectric substrate 152 is transparent to the incident pump and chirped probe beams (identified in FIG. 5 as 515) and the CARS 525. Due to the dielectric substrate 152 being transparent to both incident pump and chirped probe beams 515 and the CARS 525, the imaging CCD 142 may be on the same side of the sample as the incident beams. Advantageously, this allows for imaging of samples which may be opaque and thick which may not be properly imaged if the imaging CCD was on the opposite side of the incident beams. Additionally, the same objective 132 is used for both focusing the incident pump and chirped probe beams 515 and imaging of the CARS 525. Thus, an additional objective is not required.

Further, the use of dielectric substrate 152, such as a conventional glass coverslip, makes it compatible with existing technologies. In an aspect of the disclosure, the index of refraction on the sample side is smaller than that index of refraction of the dielectric substrate 152. This enables TIR in the dielectric substrate 152.

The system 1 has an illumination area 500 of about 60 μm to about 100 μm (x and y axes). In other aspects of the disclosure, the illumination area 500 may be smaller.

The TIR light 520 exits the dielectric substrate 152. A portion of the TIR light 520 which exits the dielectric substrate 152 is transmitted back through the objective 132. To prevent this light 520 from propagating in the reverse direction to the optics including the PCF, the system 1 also comprises a beam block 134. The beam block 134 may be a side of a lens or a mirror mount. For example, the side of lens mount 128 may be used as the beam block.

Figure 9:
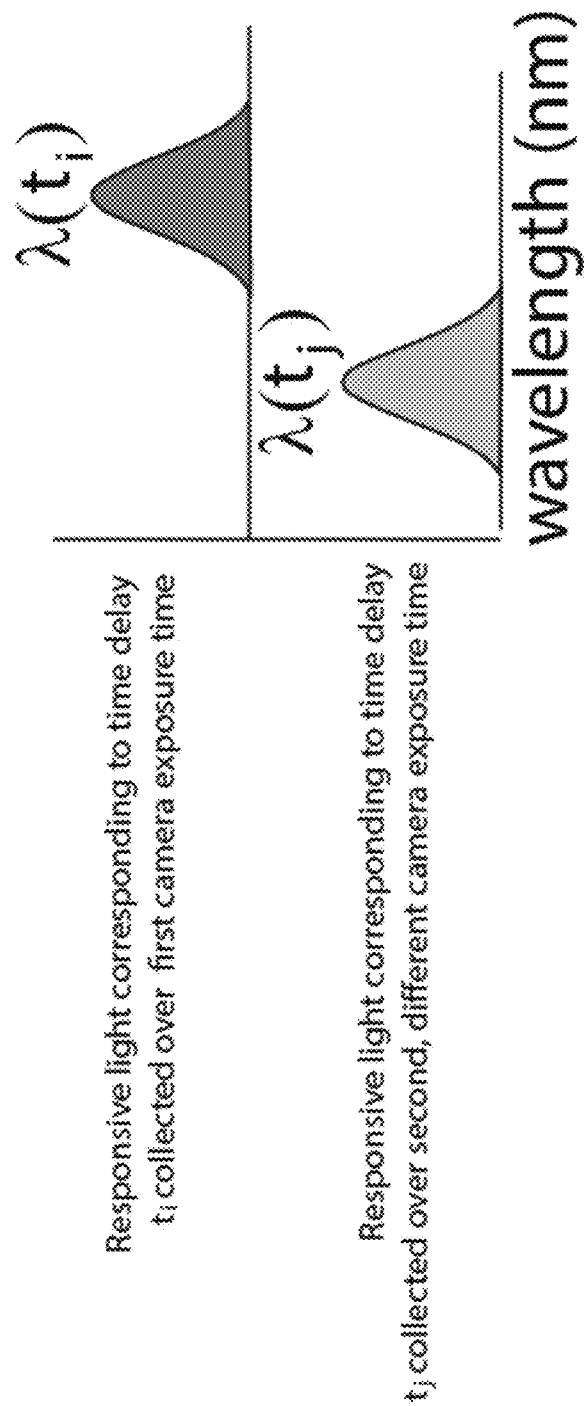
FIG. 9 depicts a representation of two different responsive light pulses corresponding to two different time delays in accordance with aspects of the disclosure.

The evanescent field 505 near the sample/substrate interface causes emission of responsive light by constituent materials in the sample 150, e.g., CARS. The CARS is shifted in wavelength from the incident pump and chirped probe beams 515 (pulses). The amount of the shift is based on the delay between the pulses (pump and chirped probe pulses). FIG. 9 depicts two representations of examples of the responsive pulses at two different delays $t_i$ and $t_j$.

The responsive light, e.g., CARS 525 (also referred to as Radiated CARS), is transmitted back through the same objective 132 as shown in FIG. 5. In an aspect of the disclosure, the cutoff for DC2 122B may be 725 nm.

One or more filters 136 and 140 may be positioned between the DC 2 122B and the imaging CCD 142. The filters may have a similar cutoff as the DC2 122B. For example, the SPFs may have a cutoff around 725 nm. The combination of the filters increases the percent of the unwanted light being rejected. The filters 136/140 and DC2 122B are not ideal and thus a certain amount of unwanted light is not rejected. More filters increase the rejected amount.

The system 1 may comprise one or more additional mirrors 101 to steer the CARS 525 to the imaging CCD 142.

The system 1 also comprises a tube lens 138. The tube lens produces an intermediate image. The tube lens 138 is within a tube body between the high NA objective 132 and an eyepiece of the microscope (or the imaging CCD 142). The intermediate image enables the formation of an image in a desired location.

The system 1 may also comprise another beam expander 126B. This beam expander 126B may be optional. Beam expander 126B decouples the size of the illumination area 500 with the size of the imaging area as seen on the imaging CCD 142. The beam expander 126B may have different positions such as a first position offset from the CARS path to the imaging CCD 142 and a second position aligned with the CARS path to the imaging CCD 142. The beam expander 126B may be manually moved between the first position and the second position (as needed). In an aspect of the disclosure, the beam expander 126B may comprise lenses such as two lenses. The two lenses may expand the beam by at least 4×. In other aspects, the two lenses may expand the beam by at least 2×.

The beam expander 126B may be used for different imaging sizes. For example, when the beam expander 126B is at the first position, the image size is the same as the illumination area 500. However, there may be a desire to see only a portion of the illumination area 500 such as a central portion. The beam expander may be used to focus the image size to a target region. For example, the image size may be about 20 μm×20 μm to about 80 μm×80 μm. 20 μm×20 μm may correspond to when a 4× beam expander 126B is used. 80 μm×80 μm may correspond to when no beam expander is used (maximum for the setup based on the optics including the tube lens, however another maximum may be used). 40 μm×40 μm may correspond to when a 2× beam expander 126B is used.

In other aspects, more than one beam expander 126B may be used. For example, one beam expander 126B having a 2× expansion may be used and another beam expander 126B having a 4× expansion may be used. Each may have the first and second positions such that the image size may be set as needed.

The imaging CCD 142 (camera) may be of any size such as, but not limited to, 1024×1024 pixels. The imaging CCD 142 may be obtained from Teledyne Princeton Instruments.

The system 1 may include additional optics such as mirrors for steering, which are not shown in FIG. 1 as needed.

Prior to use, the system 1 may be calibrated using a calibration system 2000. The calibration system 2000 is used to define the relationship between the time delays and the CARS light 525 detected, e.g., wavenumber. In other words, the spectral measurement during calibration serves to calibrate the peak Raman shift with the time delay. The measured radiated light in the forward direction may be collected via an objective 2005. This objective 2005 is moveable as needed to focus the forward radiated light toward a parabolic reflector 2015. In an aspect of the disclosure, the objective 2005 is manually moveable. However, in other aspects of the disclosure, the objective 2005 may be motorized.

The objective 2005 may be a low NA lens. For example, the NA may be less than 0.4. In an aspect of the disclosure, the NA may be 0.3 NA. The objective 2005 may also have a low magnification such as 10X. For example, the objective 2005 may be obtained from Nikon®.

The forward radiated light may be filtered by one or more filters 2010. The filters may be short pass filters. The short pass filter may be about 800 nm. In other aspects, the short pass filter may be about 785 nm. One such short pass filter may be obtained from Semrock®, Inc., Model no. BSP01-785R-25. In an aspect of the disclosure, a second short pass filter may be used. This short pass filter may have a cutoff of 750 nm. In an aspect of the disclosure, this filter may be acquired from Edmund Optics® Inc, and be Part No. 64-332. Two filters are used because of the amount of signal for measurement is weaker than the incident beam(s) and a single filter may not be sufficient to achieve the filtering of the incident beams. This is to prevent the incident beams from dominating the signal for measurement.

The filtered forward radiated light is collected and focused by a parabolic reflector 2015. The parabolic reflector 2015 couples the light into the fiber optic 2020. The fiber optic 2020 is connected to a spectrometer 2025 (spectrograph and a CCD camera). The spectrograph may comprise a grating. A 300 lines per mm grating may be used. The grating may be configured with a central wavelength of 700 nm. In other words, a wavelength of 700 nm may be directed to the center of a CCD camera. The grating may disperse wavelengths. The spectrograph also may comprise mirrors (such as two mirrors) that focus the light onto the grating and other to the CCD camera.

A known sample may be characterized to calibrate the system 1. Any known sample may be used. For example, a KDP micro crystal may be used to determine the relationship between the delay and the peak wavelength (or wavenumber) (time-dependent response). The processor 410 may be used to control the motor controller 405 to cause the motorized linear delay stage 400 to move to a plurality of different delay times, e.g., scan. For example, the scan may start from the closest position, e.g., shortest delay, and move the stage 400 to the furthest position, e.g., longest delay, in intervals, e.g., step sizes (or vice versa). The greater the number of delay times used during the calibration, the more accurate the relationship between the delay and peak wavelength may be determined. The calibration may generate a curve using a polynomial fit based on the actual measured points.

Once the system 1 is calibrated, a user may obtain a target Raman mode by changing the delay in accordance with the calibration.

CALIBRATION EXAMPLE

Figures 10A, 10B:
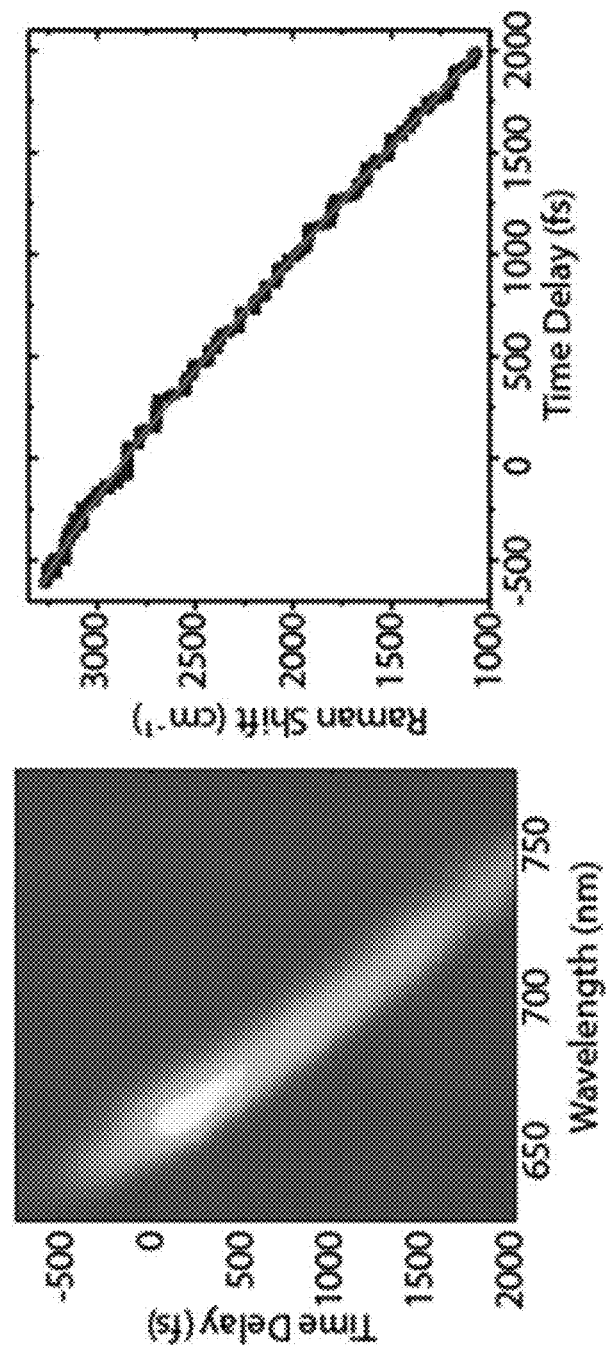
FIG. 10A depicts a heat map of an example of a calibration measurement for the system using KDP micro crystals in accordance with aspects of the disclosure.
FIG. 10B depicts an example of the dependence of peak CARS wavelength verses time delay based on calibration using the KDP micro crystals in accordance with aspects of the disclosure.

Data from about 200 delay times for the pump pulses and the chirped probe pulses (Stokes pulses) were collected using a pump pulse having a central wavelength of 809 nm. Representative CARS time-dependent response data measured from an individual KDP micro crystal is shown in FIG. 10A. This data was used to identify the peak wavelength of the radiated CARS signal and the corresponding time delay to calibrate the temporal chirp of the Stokes beam with the pump.

Different spectral components are mapped directly to the time delays. The resulting calibration curve is plotted in FIG. 10B in the form of $\omega_{as}-\omega_p$, which is the Raman shift $\omega_p-\omega_s$, as a function of the time delay. A polynomial fit to the results serves as the calibration between the Raman shift and the time delay, which was used to tune the time delay to match Raman modes of interest for imaging. This is a convenient manner to quickly image complex systems by only needing to tune a delay line to match a resonance condition for the sample of interest. FIGS. 10A and 10B depict only an example of the time delays (fs) and Raman shifts in $cm^{-1}$. This disclosure is not limited to this range of time delays (fs) and range of Raman shifts.

EXAMPLE

An example of the above-described system 1 was tested to determine the effect of the oscillator power on both a CARS response and images. The oscillator was centered at 809 nm, had a repetition rate of 82 MHz at about 50 fs pulses. The power split between the pump and Stokes paths was 4.9:1. The pump beam was delayed as described above. The power of the pump pulses was controlled using the HWP and polarizer as described above. The PCF was obtained from Newport Corporation, Inc. and had Model No. SCG-800-CARS. LP1 was an 810 nm long pass filter from Semrock® Inc., Model No. LP02-808RU-25. The beam expander 126A was 4× reflective optical beam expander. The high NA objective 132 was an oil-immersion TIRF objective obtained from Nikon® and had a 1.49 NA and Model No. Apo 100×. The beam expander 126B was also 4×. The CCD camera 142 was obtained from Teledyne Princeton Instruments, Model No. PI-MAX 7467-0028. The CDD camera was 1024×1024 pixels.

The CARS signal was doubly filtered with a 725 nm short-pass filter obtained from Edmund Optics®, Inc., Model No. 86-103 (136/140) and a 750 nm short pass dichroic mirror obtained from Semrock,® Inc., Model No. FF750-SDi02 (DC 2 122B).

The resulting image size was determined to be about 27.9 μm×27.9 μm. The illumination area was about 80 μm×80 μm.

The power of the beams at the sample 150 was measured. The fluence of beams at the sample was calculated from the measured power based on the illumination area, laser power and the repetition rate, the ratio and the controlled power of the pump (via the HWP and polarizer).

The pump fluences was varied in the test, while the Stokes fluence was unchanged for all of the spectral analysis and imaging. The pump fluence was varied from about 2.6 fJ/μm² to about 205.1 fJ/μm² for the spectral acquisition. Eleven different fluences were used for the spectral acquisition.

The pump fluence was varied from about 2.3 fJ/μm² to about 205.1 fJ/μm² for the image acquisition. The images were acquired used 21 different pump fluences. A 30 s exposure was used for all image acquisition.

A fixed *Pantoea* sp. YR343 cells was used as the sample. These fixed cells of the rhizosphere bacterium *Pantoea* sp. YR 343 were grown and processed. Prior to the imaging experiments, the cells were washed three times through centrifugation and resuspension in water to remove the organics and excess salts in the original growth media. The resulting suspension was drop-casted on the coverslip and dried before imaging.

Figures 11A, 11B, 11C, 11D:
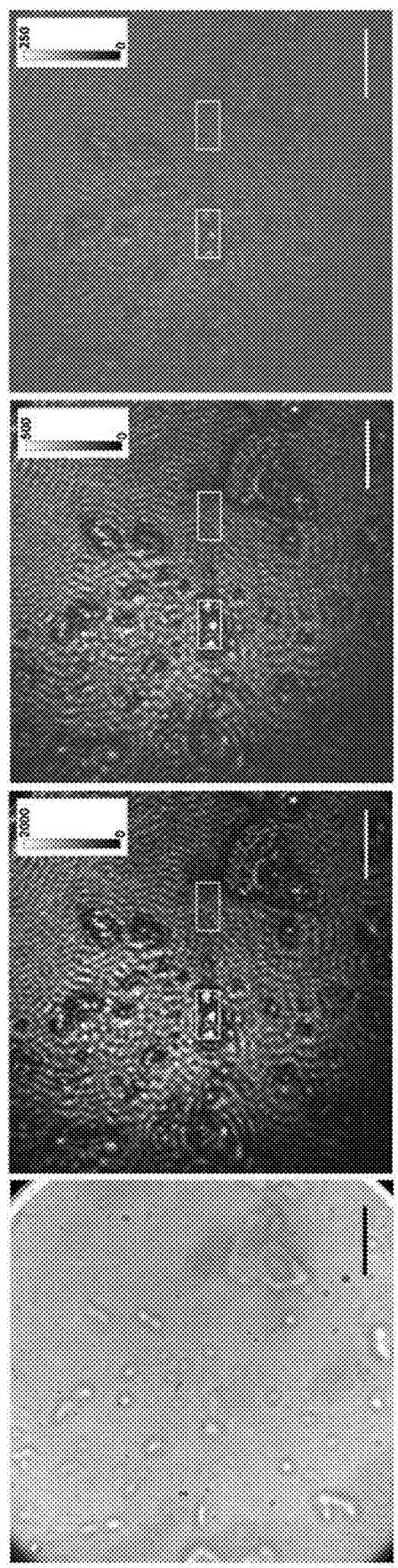
FIGS. 11A-11D illustrate results of imaging a test sample in accordance with aspects of the disclosure, where in FIG. 11A the image is a Brightfield image

The images were acquired for a Raman shift of 2880 $cm^{-1}$, corresponding to C—H stretching modes. The same Raman shift was used for the spectral acquisition. FIGS. 11B-11D show images of the sample acquired under three different pump fluences. The image in FIG. 11B was acquired using a pump fluence of 184.3 $fJ/\mu m^2$, the image in FIG. 11C was acquired using a pump fluence of 76.4 $fJ/\mu m^2$ and the image in FIG. 11D was acquired using a pump fluence of 28.6 $fJ/\mu m^2$.

A scale bar is shown in each of the images (FIGS. 11B-11D) showing 5 $\mu m$. Two regions of interest (ROIs) are identified in each of the images (FIGS. 11B-11D). One of the ROIs is identified with a first rectangle and the other is identified with a second rectangle.

As clearly shown in FIGS. 11B-11D, a decrease in pump fluence leads to a decrease in contrast, albeit individual cells such as those within the first rectangles are still visible. Ratios of integrated intensities between the two ROIs were determined for each image (at the equivalent locations in the CARS images). The ratios are 1.52, 1.26 and 1.07, respectively, which is consistent with the reduced contrast seen by eye.

One of the eleven images was acquired at a pump fluence of 21.0 $fJ/\mu m^2$ (not shown). The cells were clearly visible and the integrated contrast ratio of 1.05 was found for the same two ROIs. Since the cells were clearly visible at a pump fluence of 21.0 $fJ/\mu m^2$, a total fluence of the combined pump and Stokes beam of ~28.6 $fJ/\mu m^2$ should be sufficient for imaging some biological samples such as *Pantoea* sp. YR343 cells. This is roughly twice lower than the 70 $fJ/\mu m^2$ used by a known system based on a picosecond light source in combination with plasmonic enhancement.

A brightfield image was acquired and used for comparison of the CARS images. The brightfield image is shown in FIG. 11A. The brightfield image was acquired using a deuterium light source illuminated from the top side of the sample (calibration system 2000 side). The brightfield image (FIG. 11A) shows where the cells are in the sample. As can be seen from FIG. 11A and at least FIGS. 11B and 11C, the locations of the cells can be seen with the eye.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:
1. A system comprising:
an oscillator configured to emit femtosecond (fs) pulses of light centered at a preset wavelength;
a beam splitter disposed in a path of the emitted pulses of light and configured to split the emitted light into pulses for a pump beam and a probe beam;
a photonic crystal fiber disposed in a path of the probe beam and configured to produce pulses for a Stokes beam, which is chirped;
objective optics configured to:
receive the pump beam and the Stokes beam, where the received pump beam and Stokes beam are spatially and temporally aligned,
redirect the received pump beam and Stokes beam through a dielectric substrate towards an interface between a sample and the dielectric substrate to illuminate an area of about 20 μm×20 μm to about 100 μm×100 μm of the sample-substrate interface;

cause total internal reflection (TIR) of the pump beam and the Stokes beam at the illuminated portion of the sample-substrate interface, wherein the sample is disposed on the dielectric substrate, where the dielectric substrate is transparent to both the pump beam and the chirped probe beam; and produce corresponding evanescent waves in a portion of the sample within 200 nm of the sample-substrate interface, wherein the portion of the sample illuminated by the evanescent waves emits coherent anti-Stokes Raman scattering (CARS) light, wherein the dielectric substrate is transparent to the CARS light emitted by the portion of the sample, and collect a backward-propagating beam of pulses of CARS light that propagates from the portion of the sample through the dielectric substrate towards the objective optics; and a camera configured to receive, from the objective optics, the backward-propagating beam, and produce an image of the sample having a specific image size using the received backward-propagating beam.

2. The system of claim 1, further comprising a filter disposed in a path of the Stokes beam from the photonic crystal fiber, wherein the photonic crystal fiber provides the Stokes beam having a first spectrum and the filter provides a target spectrum from the first spectrum output from the photonic crystal fiber.

3. The system of claim 2, wherein the target spectrum is wavelength range of 850 nm-1200 nm.

4. The system of claim 1, further comprising:

a delay mirror system disposed in a path of the pump beam configured to move between a plurality of positions to change an arrival time of the pump beam with respect to the Stokes beam at the sample-substrate interface, wherein the CARS light emitted by the portion of the sample adjacent to the sample-substrate interface has a spectrum that is shifted in accordance with the arrival time corresponding to a respective position of the delay mirror system.

5. The system of claim 4, further comprises a processor configured to control the movement of the delay mirror system.

6. The system of claim 4, wherein the position of the delay mirror system is based on the sample.

7. The system of claim 4, wherein the position of the delay mirror system enables capturing of images from the CARS light having respective shifted spectra corresponding to Raman modes about 1000 $cm^{-1}$ to about 3500 $cm^{-1}$.

8. The system of claim 1, wherein the beam splitter provides pulses having a power ratio of a range from 5:1 to 1:1.5.

9. The system of claim 8, further comprising a power regulator disposed in the path of the pump beam to control the power of the pump beam seen at the sample based on a sample type.

10. The system of claim 1, wherein the fs pulses of the pump beam are configured to produce, at the sample-substrate interface, a pump fluence in a range of 20-420 $fJ/(\mu m)^2$, and the pulses of the Stokes beam are configured to produce, at the sample-substrate interface, a Stokes fluence in a range of 5-15 $fJ/(\mu m)^2$.

11. The system of claim 1, wherein the illumination area and the image size are independently controllable.

12. The system of claim 11, further comprising a beam expander disposed in front of the camera and wherein the image size is controllable using the beam expander.

13. The system of claim 12, wherein the image size is about 60 μm×60 μm to about 80 μm×80 μm.

14. The system of claim 1, wherein the pump beam and Stokes beam incident on the sample are P-polarized.

15. The system of claim 1, further comprising a lens which is offset with respect to a center of the pump beam and the Stokes beam.

16. The system of claim 1, wherein the system produces the image of an opaque sample.

17. The system of claim 1, wherein, when the sample is transparent to the CARS light, the system further comprises collection optics configured to collect forward-propagating CARS beam that propagates from the portion of the sample towards the objective optics, and a spectrograph configured to receive, from the collection optics, the forward-propagating CARS beam from the portion of the sample and produce a spectrum of the CARS light corresponding to the sample using the received forward-propagating CARS beam.

* * * * *